L

(12) United States Patent
Ng et al.

(10) Patent No.: US 9,891,653 B2
(45) Date of Patent: Feb. 13, 2018

(54) TECHNIQUES FOR CLOCK RATE CHANGES DURING DATA RATE CHANGES IN AN INTEGRATED CIRCUIT (IC)

(71) Applicant: Altera Corporation, San Jose, CA (US)

(72) Inventors: Ru Yin Ng, Bayan Lepas (MY); Gary Wallichs, San Jose, CA (US); Keith Duwel, San Jose, CA (US)

(73) Assignee: Altera Corporation, San Jose, CA (US)

(*) Notice: Subject to any disclaimer, the term of this patent is extended or adjusted under 35 U.S.C. 154(b) by 107 days.

(21) Appl. No.: 14/739,441

(22) Filed: Jun. 15, 2015

(65) Prior Publication Data
US 2016/0363954 A1  Dec. 15, 2016

(51) Int. Cl.
*G06F 1/10* (2006.01)
*G06F 1/12* (2006.01)
*G06F 13/42* (2006.01)

(52) U.S. Cl.
CPC .............. *G06F 1/10* (2013.01); *G06F 1/12* (2013.01); *G06F 13/4278* (2013.01)

(58) Field of Classification Search
CPC ..... G06F 1/04; G06F 1/08; G06F 1/10; G06F 1/12; G06F 1/20; G06F 1/32
USPC ..................................... 713/503
See application file for complete search history.

(56) References Cited

U.S. PATENT DOCUMENTS

| | | | | |
|---|---|---|---|---|
| 5,226,012 A | * | 7/1993 | Amano | ............. G06F 5/14 365/189.05 |
| 5,369,444 A | * | 11/1994 | Ersoz | ............. H04N 3/223 348/513 |
| 6,175,929 B1 | * | 1/2001 | Hsu | ............. G06F 1/08 713/322 |
| 6,834,058 B1 | * | 12/2004 | Moyal | ............. H04L 25/14 370/503 |

(Continued)

FOREIGN PATENT DOCUMENTS

WO  2011103070  8/2011

OTHER PUBLICATIONS

Intel Corporation, "PHY Interface for the PCI Express, SATA, and USB 3.1 Architectures," Version 4.3, 2007-2014, pp. 1-99.

(Continued)

*Primary Examiner* — Thomas Lee
*Assistant Examiner* — Santosh R Poudel
(74) *Attorney, Agent, or Firm* — Steven J. Cahill (57) ABSTRACT

An integrated circuit die includes interface and adapter circuits. The interface circuit exchanges data with an external device outside the integrated circuit die using a first clock signal. The interface circuit has a clock signal generation circuit to generate the first clock signal based on a second clock signal. The adapter circuit exchanges the data with the interface circuit. A frequency of the second clock signal is changed in response to an indication of a change in a data rate of the data. The adapter circuit causes the interface circuit to provide an adjustment to the first clock signal after the frequency of the second clock signal changes. The adapter circuit prevents the exchange of the data between the interface circuit and the external device until the adapter circuit receives an indication of completion of the adjustment to the first clock signal.

20 Claims, 8 Drawing Sheets

(56) References Cited

U.S. PATENT DOCUMENTS

| | | | |
|---|---|---|---|
| 6,845,457 B1* | 1/2005 | Mirov | G06F 1/08 |
| | | | 713/320 |
| 7,684,477 B1 | 3/2010 | Vijayaraghavan et al. | |
| 7,812,659 B1 | 10/2010 | Shumarayev et al. | |
| 2005/0071733 A1* | 3/2005 | Fukae | G06F 13/426 |
| | | | 714/776 |
| 2006/0115009 A1* | 6/2006 | Noguchi | G06F 1/3218 |
| | | | 375/259 |
| 2009/0249090 A1* | 10/2009 | Schmitz | G06F 1/3203 |
| | | | 713/300 |
| 2011/0222111 A1 | 9/2011 | Shima | |
| 2011/0289241 A1 | 11/2011 | Hunsaker et al. | |
| 2014/0229785 A1* | 8/2014 | Barakat | H04L 1/12 |
| | | | 714/746 |

OTHER PUBLICATIONS

European Patent Office, European Search Report and Opinion for European Patent Application EP 16 17 2378.

\* cited by examiner

TECHNIQUES FOR CLOCK RATE CHANGES DURING DATA RATE CHANGES IN AN INTEGRATED CIRCUIT (IC)

FIELD OF THE DISCLOSURE

The present invention relates to electronic circuits, and more particularly, to techniques for providing data rate changes.

BACKGROUND

PCI Express (Peripheral Component Interconnect Express), or PCIe, is a high-speed serial computer expansion bus standard. A computer expansion bus is a computer bus that transfers information between the main hardware components of a computer (including the central processing unit and memory) and peripheral devices. A computer expansion bus includes a collection of conductors (e.g., wires or signal traces) and protocols that allow for the expansion of a computer to include peripheral devices.

PCI Express devices communicate via a connection called a link. A link is a point-to-point communication channel between the ports of two PCI Express devices allowing both of the devices to transmit and receive signals. At the physical level, a link is composed of one or more lanes. Each of the lanes in a PCIe link has two differential signaling pairs of conductors, with one pair for receiving data and the other pair for transmitting data. Thus, each lane is composed of four conductors. Each differential signaling pair of conductors in each lane transmits a differential signal in serial from one device to another device. A physical PCI Express link may contain 1, 2, 4, 8, 12, 16, or 32 lanes. Each lane in a link transports data packets in eight-bit byte format simultaneously in both directions between the endpoint devices.

PCI Express is a layered protocol that includes a transaction layer, a data link layer, and a physical layer. The physical layer includes a physical coding sublayer (PCS) and a physical media attachment (PMA) layer. The physical media attachment (PMA) layer includes a serializer/deserializer and other analog circuitry. The physical coding sublayer (PCS) performs encoding and decoding of the data as well as other functions. PCI Express also includes a media access control (MAC) sublayer, which may be part of the data link layer.

BRIEF SUMMARY

According to some embodiments, an integrated circuit die includes an interface circuit and an adapter circuit. The interface circuit exchanges data with an external device that is outside the integrated circuit die using a first clock signal. The interface circuit has a clock signal generation circuit to generate the first clock signal based on a second clock signal. The adapter circuit exchanges the data with the interface circuit. A frequency of the second clock signal is changed in response to an indication of a change in a data rate of the data. The adapter circuit causes the interface circuit to provide an adjustment to the first clock signal after the frequency of the second clock signal changes. The adapter circuit prevents the exchange of data between the interface circuit and the external device until the adapter circuit receives an indication of completion of the adjustment to the first clock signal.

Various objects, features, and advantages of the present invention will become apparent upon consideration of the following detailed description and the accompanying drawings.

DETAILED DESCRIPTION

In some circuit systems, the physical layer of a high speed data transmission protocol such as PCI Express may be distributed across multiple integrated circuit dies that are housed in the same package. As an example, two integrated circuit dies may be coupled to an interposer in the same package according to 2.5 dimensional (2.5D) technology. As another example, two integrated circuit dies may be stacked vertically and coupled together according to 3 dimensional (3D) technology. The circuitry in each of the integrated circuit dies that performs the functions of the physical layer of the high speed protocol may operate in different clock signal domains. In some high speed data transmission protocols, such as PCI Express, the data rate of the data transmitted between two devices can be changed. For example, the data rate of data transmitted through a PCI Express link can be changed from a data rate of 2.5 gigatransfers per second (GT/s), 5.0 GT/s, 8.0 GT/s, or 16 GT/s to a different one of these four data rates. The data rate may also be referred to as the signaling rate.

A phase-locked loop (PLL) circuit in the PMA layer may generate a PMA clock signal that is used to clock circuitry in each integrated circuit die in the package. The PMA layer may also include a clock data recovery (CDR) circuit that adjusts the PMA clock signal based on the phase of the received data signal. When there is a request to change the data rate of the data, the PMA clock signal may be adjusted to a new frequency, and the CDR circuit in the PMA layer adjusts the phase of the PMA clock signal based on the new data rate of the received data signal. Other clock signal frequencies may also be adjusted based on the new data rate. The width of the data transmitted between the two devices (e.g., the number of lanes transmitting data in a link) may remain the same or may be changed when the data rate changes.

The PMA clock signal is unreliable during a change in the data rate of the data. The clock signals that clock the circuits in two integrated circuit (IC) dies that perform the functions of the physical layer of a high speed data transmission protocol may have unknown and unpredictable phases and/ or frequencies during a change in the data rate. When the clock signals that are used for synchronous data transmission between the two IC dies have unknown and unpredictable phases and/or frequencies, data corruption may occur.

For example, each IC die may include asynchronous first-in-first-out (FIFO) circuits that store the transmit data and the received data. Changing the frequencies of the clock signals that clock these FIFO circuits may cause the read pointer and the write pointer of one or more of these FIFO circuits to collide. This collision is caused by delay between the read clock signal and the write clock signal of the asynchronous FIFO circuit. This delay may be caused by the read clock signal or the write clock signal incurring latency as the clock signal is provided from the first IC die to the FIFO circuit in the second IC die.

When the data rate of the data changes to a new data rate, the MAC layer circuitry provides one or more signals that indicate the new data rate. According to some embodiments disclosed herein, when the MAC layer circuitry indicates a change in the data rate, circuitry in each IC die is dynamically reconfigured to preserve data integrity during the change in the data rate. The reconfiguration of the circuitry in each IC die may be transparent to a user and compliant to the PHY Interface for PCI Express (PIPE) specification.

A state machine (SM) is implemented in an adapter circuit in each IC die to control the reconfiguration of the circuitry in response to a change in the data rate. Data and control signals are transmitted between the IC dies through interface circuits in each IC die. In response to each request to change the data rate of the data, the state machines reset clock signal duty cycle calibration and clock signal phase adjustment circuits in the interface circuits. Before a request is sent to the PMA layer circuitry to change the PMA clock signal frequency, the state machines reset the FIFO circuits and circuitry in the interface circuits that are clocked by clock signals derived from the PMA clock signal.

After a change in the data rate of the data has completed, the state machines initiate clock signal phase adjustment and duty cycle calibration processes in the interface circuits so that the interface circuits can transfer data and control signals in response to the new clock signal frequencies. A state machine also retains a status signal from the PCS circuitry until the interface circuits are ready to transfer data. The state machines then provide the status signal to the MAC layer circuitry to indicate the completion of the data rate change. The status signal generation by the PCS circuitry is independent of the clock signal phase adjustment processes in the interface circuits.

Figure 1:
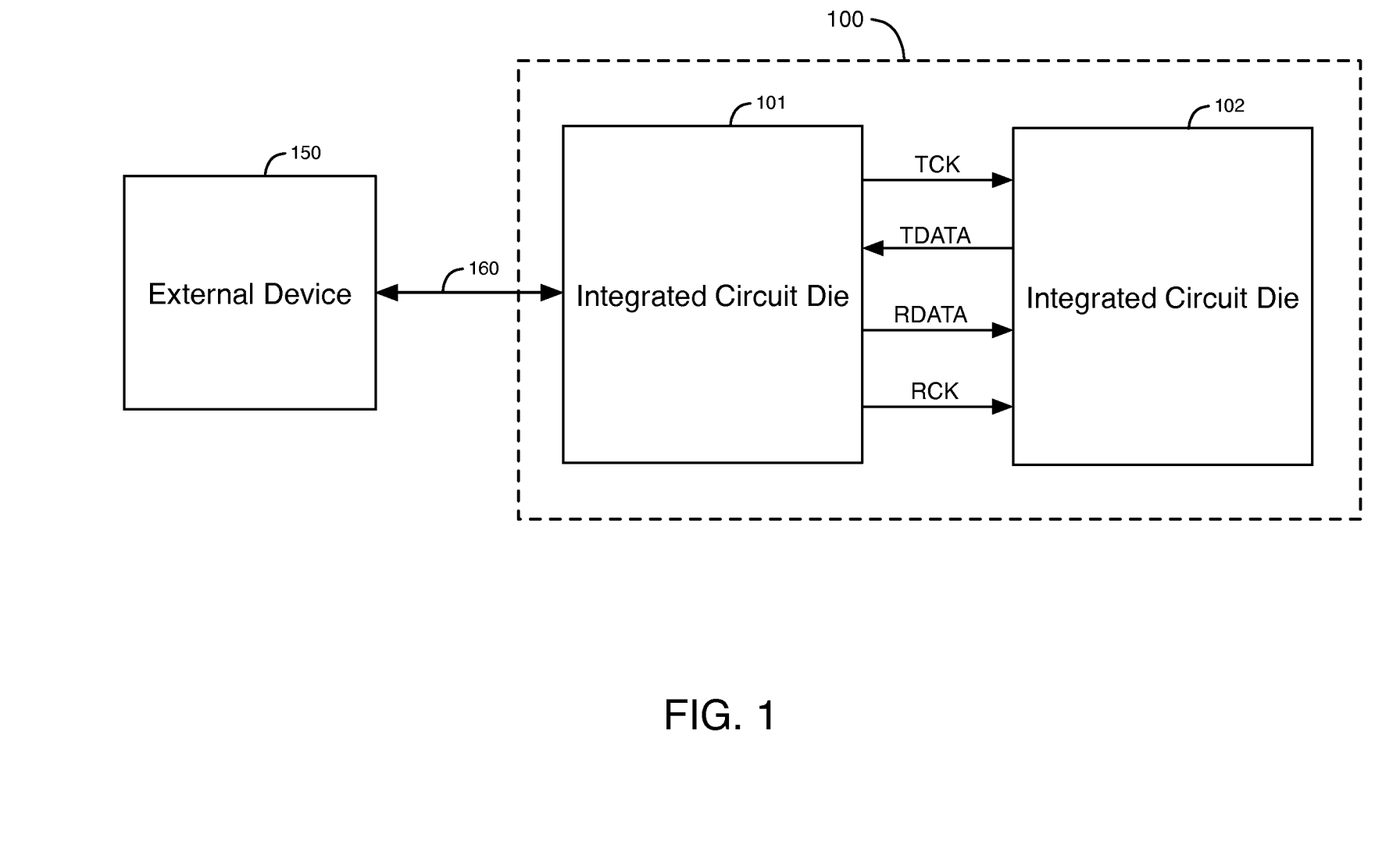
FIG. 1 illustrates a circuit system, according to an embodiment of the present invention.

FIG. 1 illustrates a circuit system 100, according to an embodiment of the present invention. Circuit system 100 includes integrated circuit (IC) die 101 and integrated circuit (IC) die 102. IC dies 101 and 102 are coupled together. IC dies 101 and 102 may be, for example, coupled together through conductors in an interposer. As another example, IC dies 101 and 102 may be vertically stacked dies that are coupled together through conductive solder bumps. IC dies 101 and 102 may be, for example, housed in the same package.

Integrated circuit die 101 transmits data RDATA, a receive clock signal RCK, and a transmit clock signal TCK to integrated circuit die 102 through external conductors. The data indicated by RDATA is transmitted to integrated circuit die 101 from an external device 150 through a link 160 according to a high speed data transmission protocol. Integrated circuit die 102 transmits data TDATA to integrated circuit die 101 through external conductors. Integrated circuit die 101 transmits the data indicated by TDATA to the external device 150 through link 160 according to the high speed data transmission protocol. The high speed data transmission protocol may be, for example, PCI Express or another protocol.

IC dies 101-102 may include any types of integrated circuits. IC dies 101-102 may be, for example, field programmable gate arrays (FPGAs), programmable logic devices (PLDs), application specific integrated circuits (ASICs), memory integrated circuits, processor integrated circuits, controller integrated circuits, etc., or any combination thereof. In some embodiments, IC die 101 and IC die 102 may be different types of integrated circuits. For example, IC die 101 may be an ASIC, such as a processor, and IC die 102 may be an FPGA.

Figure 2:
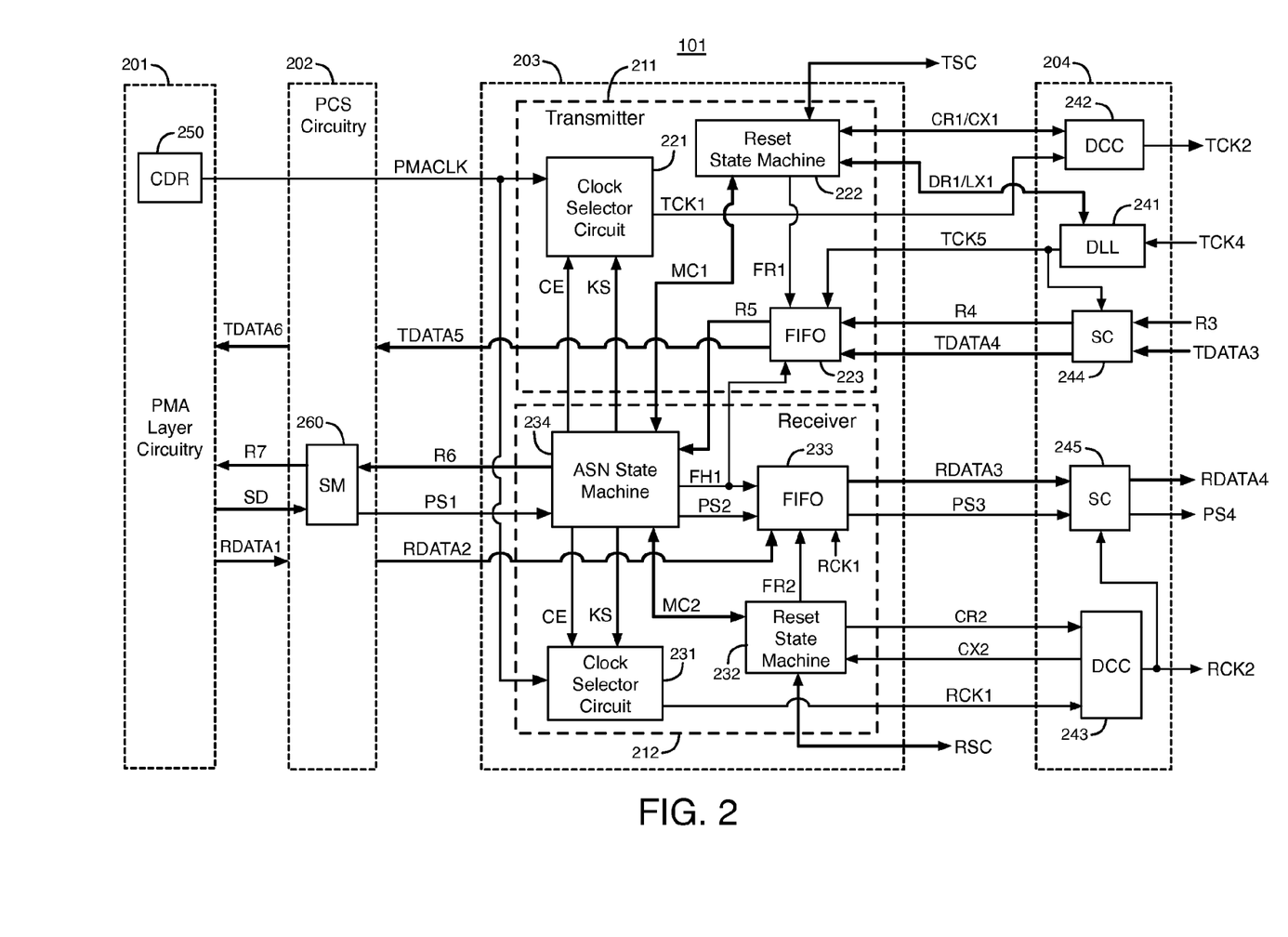
FIG. 2 illustrates details of a portion of the first integrated circuit (IC) die of FIG. 1, according to an embodiment of the present invention.

FIG. 2 illustrates details of a portion of integrated circuit (IC) die 101, according to an embodiment of the present invention. In the embodiment of Figure (FIG. 2, integrated circuit (IC) die 101 includes physical media attachment (PMA) layer circuitry 201, physical coding sublayer (PCS) circuitry 202, an adapter circuit 203, and an interface circuit 204. PMA circuitry 201 includes a clock data recovery (CDR) circuit 250. CDR circuit 250 may include a phase-locked loop circuit. PCS circuitry 202 includes a state machine (SM) circuit 260.

Adapter circuit 203 includes transmitter circuit 211 and receiver circuit 212. Transmitter circuit 211 includes clock selector circuit 221, reset state machine circuit 222, and first-in-first-out (FIFO) circuit 223. Receiver circuit 212 includes clock selector circuit 231, reset state machine circuit 232, FIFO circuit 233, and automatic speed negotiation (ASN) state machine circuit 234. In an alternative embodiment, ASN state machine circuit 234 is in transmitter circuit 211. Interface circuit 204 includes a delay-locked loop (DLL) circuit 241, duty cycle calibration (DCC) circuits 242-243, and sampler circuits (SC) 244-245. The FIFO circuits and the sampler circuits disclosed herein are storage circuits that store values of signals. A DLL circuit is a clock signal generation circuit that generates a phase adjusted output clock signal based on an input clock signal. A DCC circuit is a clock signal generation circuit that generates an output clock signal having an adjusted duty cycle relative to an input clock signal. The output clock signal of a DCC circuit ideally has a 50% duty cycle.

Figure 3:
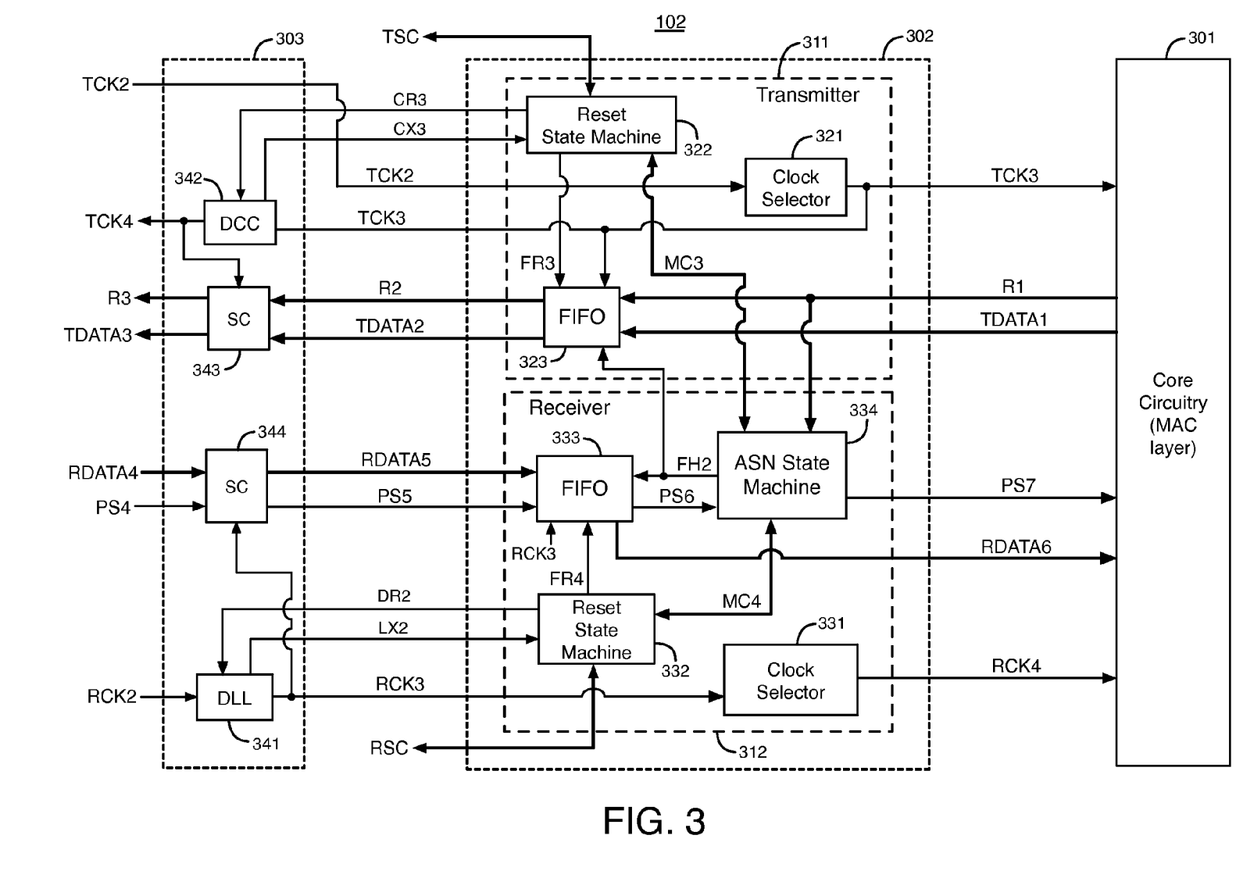
FIG. 3 illustrates details of a portion of the second integrated circuit (IC) die of FIG. 1, according to an embodiment of the present invention.

FIG. 3 illustrates details of a portion of integrated circuit (IC) die 102, according to an embodiment of the present invention. In the embodiment of FIG. 3, integrated circuit (IC) die 102 includes core circuitry 301, an adapter circuit 302, and an interface circuit 303. Core circuitry 301 includes circuitry that performs the functions of a MAC layer in a data transmission protocol, such as PCI Express. In an exemplary embodiment, core circuitry 301 includes an array of programmable logic circuits.

Adapter circuit 302 includes transmitter circuit 311 and receiver circuit 312. Transmitter circuit 311 includes clock selector circuit 321, reset state machine circuit 322, and first-in-first-out (FIFO) circuit 323. Receiver circuit 312 includes clock selector circuit 331, reset state machine circuit 332, FIFO circuit 333, and automatic speed negotiation (ASN) state machine circuit 334. In an alternative embodiment, ASN state machine 334 is in transmitter circuit 311. Interface circuit 303 includes a delay-locked loop (DLL) circuit 341, duty cycle calibration (DCC) circuit 342, and sampler circuits (SC) 343-344. In an embodiment, each of the FIFO circuits 223, 233, 323, and 333 is an asynchronous FIFO circuit that writes data into storage in the FIFO circuit using a write clock signal and reads data from the storage of the FIFO circuit using a read clock signal that is different from the write clock signal.

The clock data recovery (CDR) circuit 250 in PMA circuitry 201 generates a clock signal PMACLK that is provided to an input of each of clock selector circuits 221 and 231 through conductors. Clock signal PMACLK may be, for example, PCLK in the PIPE specification. Clock selector circuit 221 generates a transmit clock signal TCK1 based on clock signal PMACLK. Clock signal TCK1 is provided to an input of DCC circuit 242 through a conductor. DCC circuit 242 generates a clock signal TCK2 based on clock signal TCK1. Clock signal TCK2 is provided through an external conductor to IC die 102.

Referring to FIG. 3, clock signal TCK2 is provided through interface circuit 303 through an internal conductor to an input of clock selector circuit 321. Clock selector circuit 321 generates an output clock signal TCK3 based on clock signal TCK2. Clock selector circuit 321 may be, for example, a multiplexer circuit that is configured to select clock signal TCK2. Clock signal TCK3 is provided to core circuitry 301, to an input of FIFO circuit 323, and to an input of DCC circuit 342. DCC circuit 342 generates a clock signal TCK4 based on clock signal TCK3. Clock signal TCK4 is provided through an external conductor to IC die 101. Referring again to FIG. 2, clock signal TCK4 is provided to an input of DLL circuit 241. DLL circuit 241 generates a clock signal TCK5 based on clock signal TCK4. Clock signal TCK5 is provided through a conductor to an input of FIFO circuit 223. Clock signal TCK5 may also be provided to state machine circuit 222.

Clock selector circuit 231 generates a receive clock signal RCK1 based on clock signal PMACLK. Clock signal RCK1 is provided to an input of FIFO circuit 233 through a conductor. Clock signal RCK1 may also be provided to inputs of state machines 232 and 234. Clock signal RCK1 is also provided to an input of DCC circuit 243. DCC circuit 243 generates a clock signal RCK2 based on clock signal RCK1. Clock signal RCK2 is provided through an external conductor to IC die 102.

Referring to FIG. 3, clock signal RCK2 is provided to an input of DLL circuit 341. DLL circuit 341 generates a clock signal RCK3 based on clock signal RCK2. Clock signal RCK3 is provided through a conductor to an input of FIFO circuit 333 and to an input of clock selector circuit 331. Clock signal RCK3 may also be provided to state machine circuits 332 and 334. Clock selector circuit 331 generates an output clock signal RCK4 based on clock signal RCK3. Clock selector circuit 331 may be, for example, a multiplexer circuit that is configured to select clock signal RCK3. Clock signal RCK4 is provided to core circuitry 301.

Figure 4:
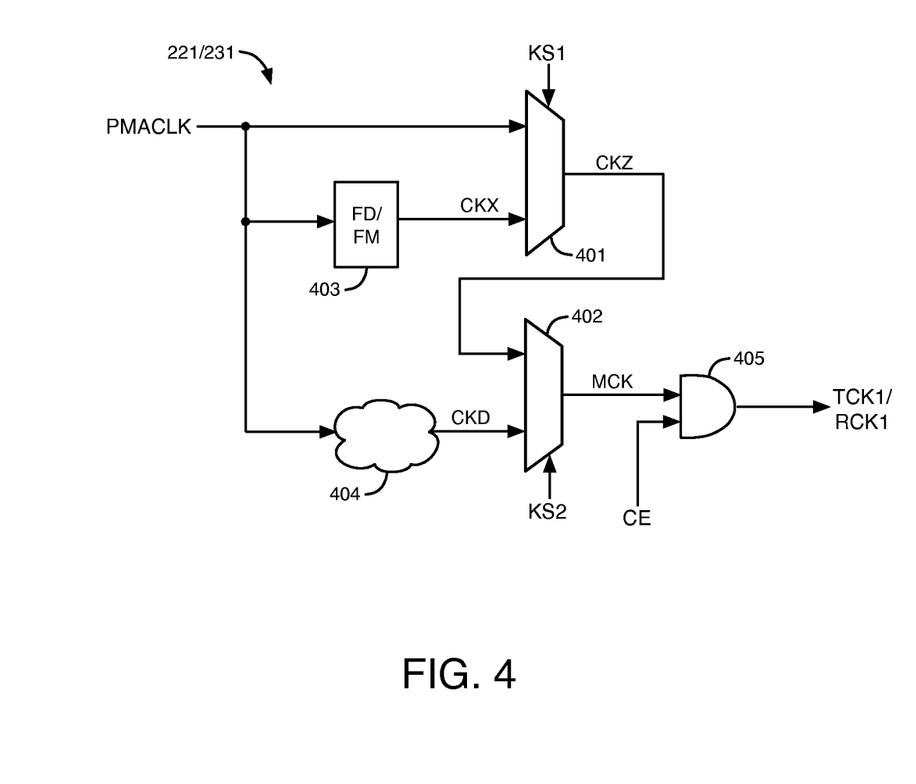
FIG. 4 illustrates an example of a clock selector circuit, according to an embodiment of the present invention.

FIG. 4 illustrates an example of a clock selector circuit, according to an embodiment of the present invention. The clock selector circuit shown in FIG. 4 is an example of each of the clock selector circuits 221 and 231 shown in FIG. 2. Thus, in an embodiment, each of the clock selector circuits 221 and 231 has an instance of the circuitry shown in FIG. 4. The clock selector circuit of FIG. 4 includes two multiplexer circuits 401-402, a frequency divider (FD) or frequency multiplier (FM) circuit 403, a clock routing network 404, and an AND logic gate circuit 405.

Clock signal PMACLK is provided to a first multiplexing input of multiplexer circuit 401, to an input of FD/FM circuit 403, and to an input of clock routing network 404 through conductors. FD/FM circuit 403 generates an output clock signal CKX by dividing or multiplying the frequency of clock signal PMACLK. Clock signal CKX is provided to a second multiplexing input of multiplexer circuit 401 through a conductor. A first clock select signal KS1 is provided to a select input of multiplexer circuit 401 from ASN state machine circuit 234 through a conductor. Multiplexer circuit 401 generates an output clock signal CKZ. Multiplexer circuit 401 selects either clock signal PMACLK or clock signal CKX to generate clock signal CKZ based on the logic state of clock select signal KS1.

Clock signal CKZ is provided to a first multiplexing input of multiplexer circuit 402 through a conductor. Clock routing network 404 delays clock signal PMACLK to generate a delayed clock signal CKD. Clock signal CKD is provided to a second multiplexing input of multiplexer circuit 402 through a conductor. A second clock select signal KS2 is provided to a select input of multiplexer circuit 402 from ASN state machine circuit 234 through a conductor. Multiplexer circuit 402 generates an output clock signal MCK. Multiplexer circuit 402 selects either clock signal CKD or clock signal CKZ to generate clock signal MCK based on the logic state of signal KS2. Select signals KS1-KS2 are shown collectively as signals KS in FIG. 2. Clock signal MCK is provided to a first input of AND logic gate circuit 405 through a conductor. A clock enable signal CE is provided to a second input of AND logic gate circuit 405 from ASN state machine circuit 234 through a conductor. AND logic gate circuit 405 generates clock signal TCK1 or RCK1 by performing an AND Boolean logic function on the values of signals MCK and CE. Clock selector circuits 221 and 231 generate clock signals TCK1 and RCK1, respectively, as shown in FIG. 2.

IC die 101 receives data that is transmitted to IC die 101 from an external device 150 through a two-way link 160 according to a data transmission protocol, such as PCI Express. Although embodiments disclosed herein are discussed in the context of PCI Express, it should be understood that embodiments disclosed herein can be used with other data transmission standards or protocols. Normal operation of the circuitry shown in FIGS. 2-3 is now described during which the data rate of the transmitted data is constant. The data received from external device 150 is provided to PMA circuitry 201. PMA circuitry 201 is an interface circuit that exchanges data with external device 150 that is outside IC die 101. If the data is transmitted according to PCI Express, the data is transmitted to IC die 101 in serial, and a de-serializer in PMA circuitry 201 de-serializes the serial data (and performs other functions on the data) to generate parallel data signals RDATA1 that indicate the data received by IC die 101 from external device 150.

Data signals RDATA1 are provided from PMA layer circuitry 201 to PCS circuitry 202 through conductors. PCS circuitry 202 decodes the data indicated by data signals RDATA1 to generate decoded received data in parallel data signals RDATA2. Signals RDATA2 ideally indicate the same data that was encoded by the external device 150 for transmission to IC die 101 through link 160. Data signals RDATA2 are provided in parallel to FIFO circuit 233 through conductors. The received data indicated by data signals RDATA2 is stored in FIFO circuit 233. The received data stored in FIFO circuit 233 is provided to interface circuit 204 through conductors as parallel data signals RDATA3. The received data indicated by data signals RDATA3 is stored in sampler circuit 245 in interface circuit 204 in response to clock signal RCK2. The received data stored in sampler circuit 245 is transmitted to IC die 102 through external conductors as parallel data signals RDATA4.

Referring to FIG. 3, the received data indicated by data signals RDATA4 is provided to interface circuit 303 and is stored in sampler circuit 344 in response to clock signal RCK3. The received data stored in sampler circuit 344 is provided to FIFO circuit 333 through conductors as parallel data signals RDATA5. The received data indicated by data signals RDATA5 is stored in FIFO circuit 333. The received data stored in FIFO circuit 333 is provided to core circuitry 301 through conductors as parallel data signals RDATA6.

IC die 102 generates transmit data for transmission to the external device 150 through link 160. The transmit data is provided to IC die 101. IC die 101 transmits the transmit data to the external device 150 through the two-way link 160 according to the data transmission protocol (e.g., PCI Express). The portion of the core circuitry 301 that implements the functions of the MAC layer generates parallel data signals TDATA1 that indicate the transmit data. Data signals TDATA1 are provided to inputs of FIFO circuit 323 in parallel through conductors. The transmit data indicated by data signals TDATA1 is stored in FIFO circuit 323. The transmit data stored in FIFO circuit 323 is provided to sampler circuit 343 in interface circuit 303 through conductors as parallel data signals TDATA2. The transmit data indicated by data signals TDATA2 is stored in sampler circuit 343 in response to clock signal TCK4.

The transmit data stored in sampler circuit 343 is transmitted to IC die 101 through external conductors as parallel data signals TDATA3. Referring to FIG. 2, the transmit data indicated by data signals TDATA3 is provided to interface circuit 204 and is stored in sampler circuit 244 in response to clock signal TCK5. The transmit data stored in sampler circuit 244 is provided to FIFO circuit 223 through conductors as parallel data signals TDATA4. The transmit data indicated by data signals TDATA4 is stored in FIFO circuit 223. The transmit data stored in FIFO circuit 223 is provided to PCS circuitry 202 through conductors as parallel data signals TDATA5. The PCS circuitry 202 encodes the transmit data indicated by data signals TDATA5 to generate encoded transmit data and provides the encoded transmit data to PMA layer circuitry 201 through conductors as parallel data signals TDATA6. PMA layer circuitry 201 serializes the encoded transmit data indicated by data signals TDATA6 and provides the serialized encoded transmit data to the external device 150 through link 160 according to the data transmission protocol (e.g., PCI Express).

In circuit system 100, the MAC layer circuitry in core circuitry 301 generates signals R1 that indicate the data rate of the data transmitted between system 100 and the external device 150 through link 160. Signals R1 are provided to FIFO circuit 323 and to ASN state machine 334 through conductors, as shown in FIG. 3. The data rate indicated by signals R1 is stored in FIFO circuit 323. The data rate stored in FIFO circuit 323 is provided to sampler circuit 343 through conductors as signals R2. The data rate indicated by signals R2 is stored in sampler circuit 343 in response to clock signal TCK4.

The data rate stored in sampler circuit 343 is provided to sampler circuit 244 in interface circuit 204 in IC die 101 through external conductors as signals R3, as shown in FIG. 2. The data rate indicated by signals R3 is stored in sampler circuit 244 in response to clock signal TCK5. The data rate stored in sampler circuit 244 is provided to FIFO circuit 223 through conductors as signals R4. The data rate indicated by signals R4 is stored in FIFO circuit 223. The data rate stored in FIFO circuit 223 is provided to ASN state machine 234 through conductors as signals R5. The data rate indicated by signals R5 is stored in ASN state machine 234. The data rate stored in ASN state machine 234 from signals R5 is provided to state machine 260 through conductors as signals R6.

In PCI Express and other data transmission protocols, the data rate of data transmitted between two devices can be changed. A change in the data rate of the data transmitted between system 100 and external device 150 through link 160 is initiated by the MAC layer circuitry in core circuitry 301. To initiate a change in the data rate of the data transmitted between system 100 and external device 150, the MAC layer circuitry adjusts signals R1 to indicate the new data rate. In response to the MAC layer circuitry indicating a change in the data rate of the data by adjusting signals R1, circuitry in each IC die 101-102 is dynamically reconfigured to preserve data integrity during the change in the data rate, as described below with respect to FIGS. 5A-5C. In addition, CDR circuit 250 adjusts the phase of clock signal PMACLK based on the new data rate of the received data.

Figure 5A:
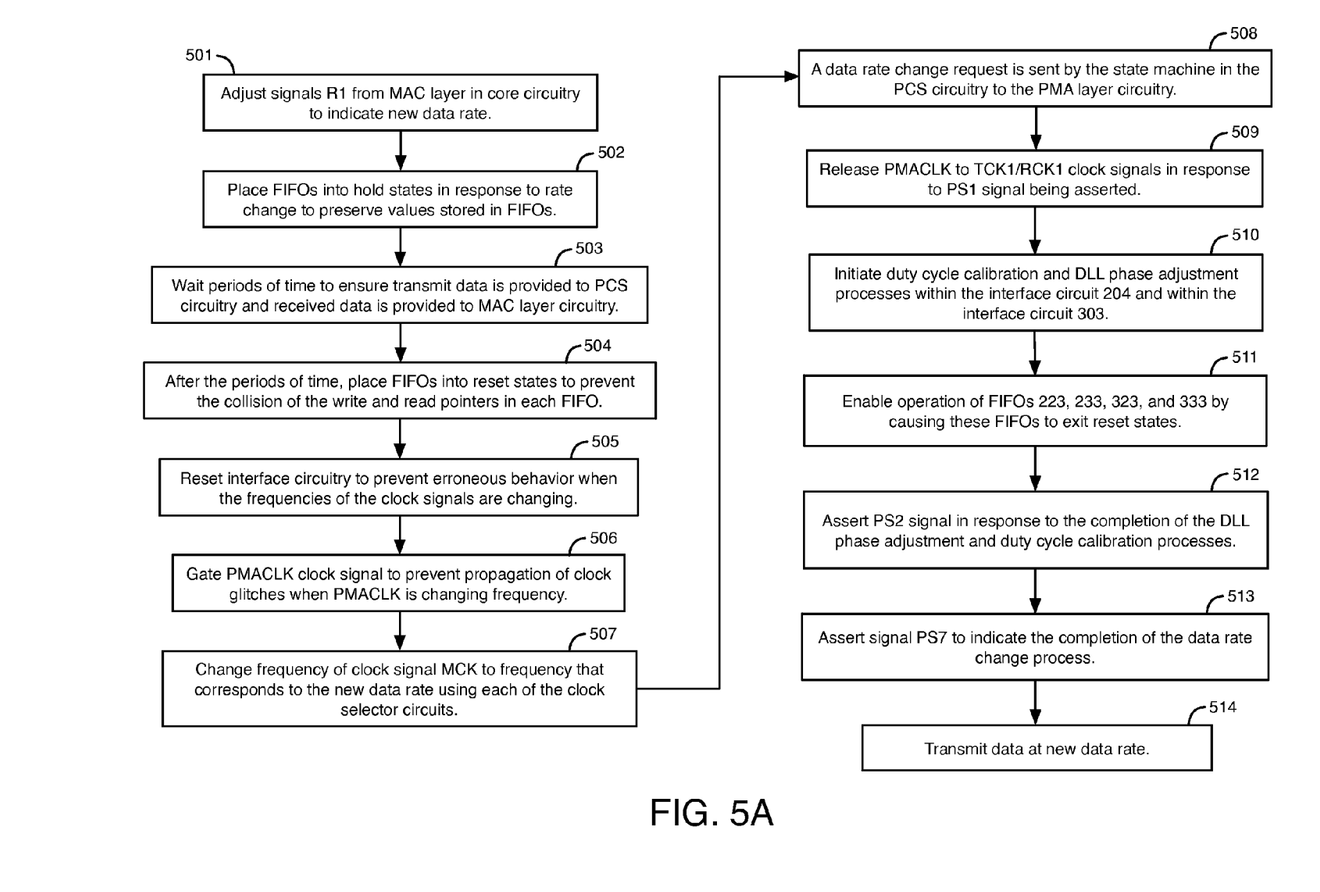
FIGS. 5A-5C are flow charts illustrating operations that can be performed to allow for a change in the date rate of data transmitted between the circuit system of FIG. 1 and an external device, according to an embodiment of the present invention.

FIG. 5A is a flow chart illustrating operations that can be performed to allow for a change in the date rate of data transmitted between circuit system 100 and external device 150, according to an embodiment of the present invention. In the embodiment of FIG. 5A, the data rate of the data transmitted through link 160 is changed, the frequencies of clock signals TCK1-TCK5 and RCK1-RCK4 are changed, and the data rate or data rates of the data indicated by signals TDATA1-TDATA6 and RDATA1-RDATA6 provided through adapter circuits 203 and 302 and interface circuits 204 and 303 are also changed.

To initiate a change in the data rate of the data transmitted between system 100 and external device 150, the MAC layer circuitry in core circuitry 301 adjusts signals R1 to indicate the new data rate of the data in operation 501. Signals R1 are adjusted from first values that indicate the current data rate of the data transmitted between system 100 and external device 150 to second values that indicate the new data rate of the data in operation 501. The second values of signals R1 that indicate the new data rate propagate to FIFO circuit 323, ASN state machine circuit 334, sampler circuit 343, sampler circuit 244, FIFO circuit 223, and ASN state machine circuit 234 to state machine 260 as signals R2-R6, as described above. The adjustment to signals R1-R6 indicates a change in the data rate of the data exchanged between system 100 and external device 150 through link 160. The adjustment to signals R1-R6 in operation 501 (or one or more additional control signals) also indicates that the data rate or rates of the data indicated by signals TDATA1-TDATA6 and RDATA1-RDATA6 are also being changed.

In response to signals R1 changing from the first values to the second values that indicate the new data rate of the data, ASN state machine circuit 334 asserts FIFO hold signal FH2 in operation 502. Signal FH2 is provided to control inputs of FIFO circuits 323 and 333. In response to FIFO hold signal FH2 being asserted by state machine 334 in operation 502, each of the FIFO circuits 323 and 333 is placed into a hold state that preserves the values of the signals stored in FIFO circuits 323 and 333. When FIFO circuits 323 and 333 are in the hold states, the values stored in FIFO circuits 323 and 333 are maintained, and no new values are stored in FIFO circuits 323 and 333.

In response to signals R5 changing from the first values to the second values that indicate the new data rate of the data, ASN state machine 234 asserts a FIFO hold signal FH1 in operation 502. Signal FH1 is provided to control inputs of FIFO circuits 223 and 233. In response to FIFO hold signal FH1 being asserted by state machine 234 in operation 502, each of the FIFO circuits 223 and 233 is placed into a hold state that preserves the values of the signals stored in FIFO circuits 223 and 233. When FIFO circuits 223 and 233 are in the hold states, the values stored in FIFO circuits 223 and 233 are maintained, and no new values are stored in FIFO circuits 223 and 233.

In operation 503, ASN state machine 234 waits a period of time to ensure that the transmit data currently stored in FIFO circuit 223 is provided to the PCS circuitry 202. Also, in operation 503, ASN state machine 334 waits a period of time to ensure that the received data currently stored in FIFO circuit 333 is provided to the MAC layer circuitry in core circuitry 301. The periods of time that state machines 234 and 334 wait in operation 503 may be the same or different periods of time. After the periods of time, ASN state machines 234 and 334 proceed to operation 504. In an embodiment, one or more programmable counter circuits may determine the period of time that each of the ASN state machines 234 and 334 waits in operation 503 before proceeding to operation 504.

ASN state machine 234 communicates with reset state machines 222 and 232 through two-way control signals MC1 and two-way control signals MC2, respectively. In operation 504, ASN state machine 234 places FIFO circuits 223 and 233 into reset states to prevent collision of the write pointer and the read pointer in each of the FIFO circuits 223 and 233. Clock signal TCK5 may be the write clock signal of FIFO circuit 223, and the read clock signal of FIFO circuit 223 may be another clock signal not shown in FIG. 2. In operation 504, ASN state machine 234 adjusts one or more of control signals MC1 to cause reset state machine 222 to assert a FIFO reset signal FR1 that is provided to FIFO circuit 223. In response to signal FR1 being asserted, FIFO circuit 223 is reset. When FIFO circuit 223 is reset, all of the values stored in FIFO circuit 223 are cleared to predefined values (e.g., zero values). FIFO circuit 223 is no longer in a hold state after being reset.

Clock signal RCK1 and another clock signal not shown in FIG. 2 may be the read and write clock signals, respectively, of FIFO circuit 233. In operation 504, ASN state machine 234 also adjusts one or more of control signals MC2 to cause reset state machine 232 to assert a FIFO reset signal FR2 that is provided to FIFO circuit 233. In response to signal FR2 being asserted, FIFO circuit 233 is reset. When FIFO circuit 233 is reset, all of the values stored in FIFO circuit 233 are cleared to predefined values (e.g., zero values). FIFO circuit 233 is no longer in a hold state after being reset. ASN state machine 234 maintains FIFO circuits 223 and 233 in the reset states until operation 511. FIFO circuits 223 and 233 do not store new values while in the reset states.

ASN state machine 334 communicates with reset state machines 322 and 332 through two-way control signals MC3 and two-way control signals MC4, respectively. In operation 504, ASN state machine 334 places FIFO circuits 323 and 333 into reset states to prevent collision of the write pointer and the read pointer in each of the FIFO circuits 323 and 333. Clock signal TCK3 and another clock signal not shown in FIG. 3 may be the read and write clock signals, respectively, of FIFO circuit 323. In operation 504, ASN state machine 334 adjusts one or more of control signals MC3 to cause reset state machine 322 to assert a FIFO reset signal FR3 that is provided to FIFO circuit 323. In response to signal FR3 being asserted, FIFO circuit 323 is reset. When FIFO circuit 323 is reset, all of the values stored in FIFO circuit 323 are cleared to predefined values (e.g., zero values). FIFO circuit 323 is no longer in a hold state after being reset.

Clock signal RCK3 and another clock signal not shown in FIG. 3 may be the write and read clock signals, respectively, of FIFO circuit 333. In operation 504, ASN state machine 334 also adjusts one or more of control signals MC4 to cause reset state machine 332 to assert a FIFO reset signal FR4 that is provided to FIFO circuit 333. In response to signal FR4 being asserted, FIFO circuit 333 is reset. When FIFO circuit 333 is reset, all of the values stored in FIFO circuit 333 are cleared to predefined values (e.g., zero values). FIFO circuit 333 is no longer in a hold state after being reset. ASN state machine 334 maintains FIFO circuits 323 and 333 in the reset states until operation 511. FIFO circuits 323 and 333 do not store new values while in the reset states.

In operation 505, circuitry within the interface circuits 204 and 303 is reset to prevent erroneous behavior when the frequencies of the clock signals TCK1-TCK5 and RCK1-RCK4 are adjusted during a change in the data rate of the data transmitted between system 100 and external device 150. In operation 505, ASN state machine 234 in FIG. 2 adjusts one or more of control signals MC1 to cause reset state machine 222 to de-assert signals DR1 and CR1 (e.g., drive signals DR1 and CR1 low). In response to signal DR1 being de-asserted, DLL circuit 241 is reset. In response to signal CR1 being de-asserted, DCC circuit 242 is reset. Circuits 241-242 may be reset by clearing values stored in circuits 241-242 to predefined values (e.g., zero values). Reset state machine 222 also resets sampler circuit 244 in operation 505, for example, by using one or both of signals DR1 and CR1.

In operation 505, ASN state machine 234 also adjusts one or more of control signals MC2 to cause reset state machine 232 to de-assert signal CR2 (e.g., drive signal CR2 low). In response to signal CR2 being de-asserted, DCC circuit 243 is reset. Circuit 243 may be reset by clearing values stored in circuit 243 to predefined values (e.g., zero values). Reset state machine 232 also resets sampler circuit 245 in operation 505, for example, by using signal CR2. Sampler circuits in the interface circuits are reset by clearing values stored in the sampler circuits to predefined values (e.g., zero values).

In operation 505, ASN state machine 334 in FIG. 3 adjusts one or more of control signals MC3 to cause reset state machine 322 to de-assert signal CR3 (e.g., drive signal CR3 low). In response to signal CR3 being de-asserted, DCC circuit 342 is reset. DCC circuit 342 may be reset by clearing values stored in circuit 342 to predefined values (e.g., zero values). Reset state machine 322 also resets sampler circuit 343 in operation 505, for example, by using signal CR3.

In operation 505, ASN state machine 334 adjusts one or more of control signals MC4 to cause reset state machine 332 to de-assert signal DR2 (e.g., drive signal DR2 low). In response to signal DR2 being de-asserted, DLL circuit 341 is reset. DLL circuit 341 may be reset by clearing values stored in circuit 341 to predefined values (e.g., zero values). Reset state machine 332 also resets sampler circuit 344 in operation 505, for example, by using signal DR2. Operations 504-505 may be performed at the same time, in the order shown in FIG. 5A, or alternatively, operation 505 may be performed before operation 504. The functions of operations 504-505 are performed after the periods of time in operation 503 and in response to the indication to change the data rate of the data asserted in operation 501.

In operation 506, ASN state machine 234 de-asserts clock enable signal CE to a logic low state to gate clock signal PMACLK. Clock enable signal CE is provided to AND gate circuit 405 in each of clock selector circuits 221 and 231, as shown in FIG. 4. Clock selector circuit 221 prevents oscillations in clock signal PMACLK from propagating to clock signal TCK1 in response to signal CE being de-asserted in operation 506. Clock selector circuit 231 prevents oscillations in clock signal PMACLK from propagating to clock signal RCK1 in response to signal CE being de-asserted in operation 506. Preventing oscillations in clock signal PMA-CLK from propagating to clock signals TCK1 and RCK1 in operation 506 prevents glitches from occurring in clock signals TCK1 and RCK1 when the phase and/or frequency of clock signal PMACLK is changing during a change in the data rate of the data.

In operation 507, ASN state machine 234 adjusts clock select signals KS to cause clock selector circuits 221 and 231 to change the frequency of clock signal MCK in FIG. 4. In operation 507, ASN state machine 234 causes each of clock selector circuits 221 and 231 to generate a new frequency in clock signal MCK that corresponds to the new data rate indicated by signals R5. ASN state machine 234 may adjust one or both of clock select signals KS1-KS2 to cause one or both of multiplexers 401-402 in each of clock selector circuits 221 and 231 to select a different clock signal to generate clock signal MCK. As an example, ASN state machine 234 may adjust clock select signal KS1 to cause multiplexer 401 to change from generating clock signal CKZ based directly on clock signal PMACLK to generating clock signal CKZ based on clock signal CKX. This change may cause the frequency of clock signal MCK to increase or decrease, depending on whether circuit 403 is a frequency multiplier or frequency divider, respectively. The functions of operations 506-507 are performed in response to the indication to change the data rate of the data transmitted through link 160 and the data rate of the data indicated by signals TDATA1-TDATA6 and RDATA1-RDATA6 that was generated in operation 501. In operation 507, clock enable signal CE is still de-asserted, preventing oscillations in clock signal MCK from propagating to clock signals TCK1 and RCK1.

In operation 508, state machine 260 in PCS circuitry 202 sends a request to the PMA layer circuitry 201 to change the data rate of the data transmitted between system 100 and external device 150. Specifically, state machine 260 adjusts signals R7 to indicate the new data rate for the data in operation 508. Signals R7 are generated by state machine 260 and provided through conductors to PMA layer circuitry 201. In response to receiving a change in signals R7 that indicate a new data rate, PMA layer circuitry 201 performs functions associated with changing the data rate of the data transmitted between system 100 and external device 150 to the new data rate. For example, CDR circuit 250 may adjust the phase and/or frequency of clock signal PMACLK based on the new data rate of the data.

After PMA layer circuitry 201 has completed the functions associated with changing the data rate of the data, PMA layer circuitry 201 adjusts signals SD to indicate that these functions are complete and that data is ready to be transmitted and received at the new data rate. The adjustment of signals SD further indicates that the phase and/or frequency of clock signal PMACLK has been successfully adjusted based on the new data rate of the data. Signals SD are generated by PMA layer circuitry 201 and provided to state machine 260 through conductors. In response to receiving values in signals SD indicating that the data rate change functions in PMA layer circuitry 201 are complete and that data is ready to be transmitted and received at the new data rate, state machine 260 asserts physical layer status signal PS1. Signal PS1 may be the PhyStatus signal in the PIPE specification. Signal PS1 is provided through a conductor to ASN state machine circuit 234.

In operation 509, ASN state machine 234 causes clock signal PMACLK to be released to clock signals TCK1 and RCK1 in response to status signal PS1 being asserted. PCS circuitry 202 may, for example, assert signal PS1 to indicate that clock signal PMACLK is stable and/or to indicate that PMA layer circuitry 201 and PCS circuitry 202 have completed the functions associated with changing the data rate of the data. In operation 509, ASN state machine 234 asserts the clock enable signal CE to a logic high state to cause clock selector circuits 221 and 231 to provide oscillations in clock signals PMACLK and MCK to clock signals TCK1 and RCK1. The oscillations in clock signal TCK1 propagate to clock signals TCK2-TCK5. The oscillations in clock signal RCK1 propagate to clock signals RCK2-RCK4. Clock signals TCK1-TCK5 and RCK1-RCK4 have different frequencies after operation 509 relative to their respective frequencies before the change in the date rate of the data.

Figure 5B:
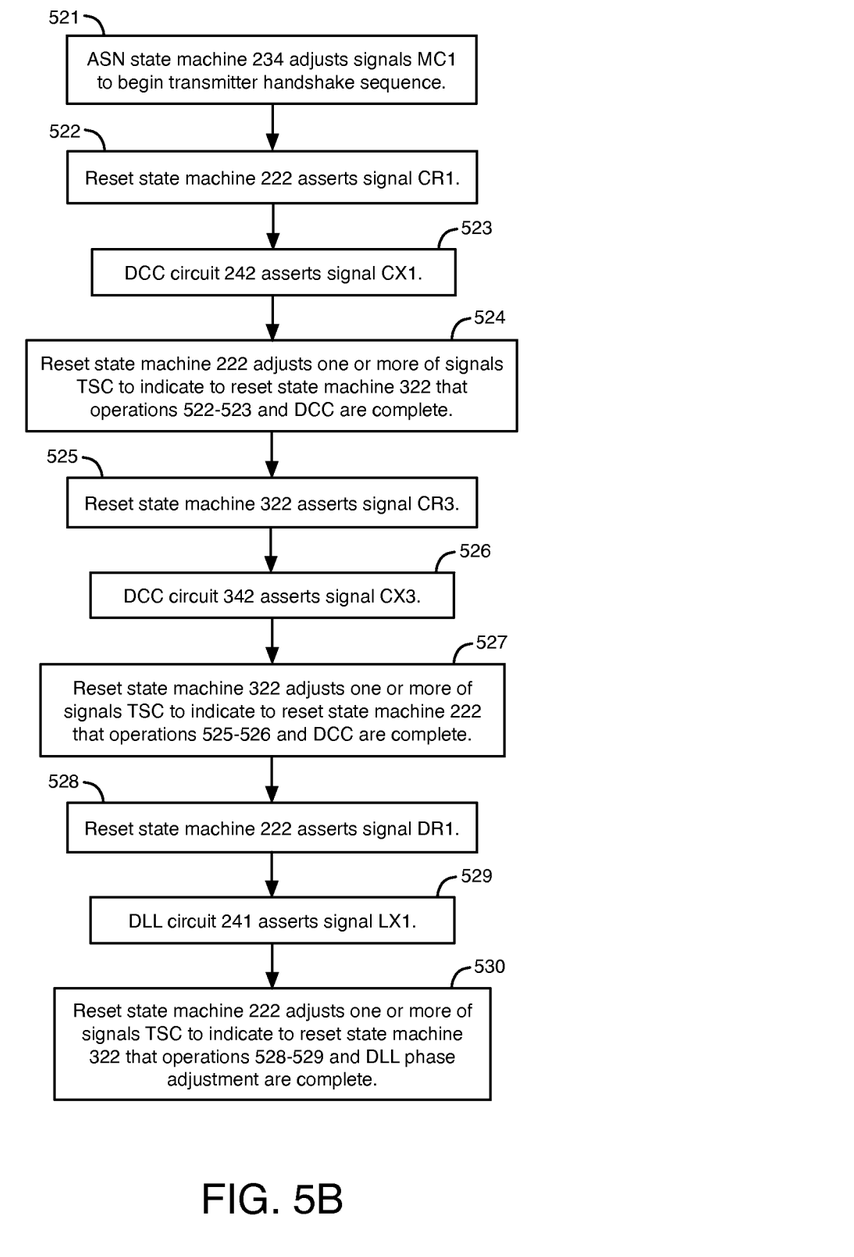
Figure 5C:
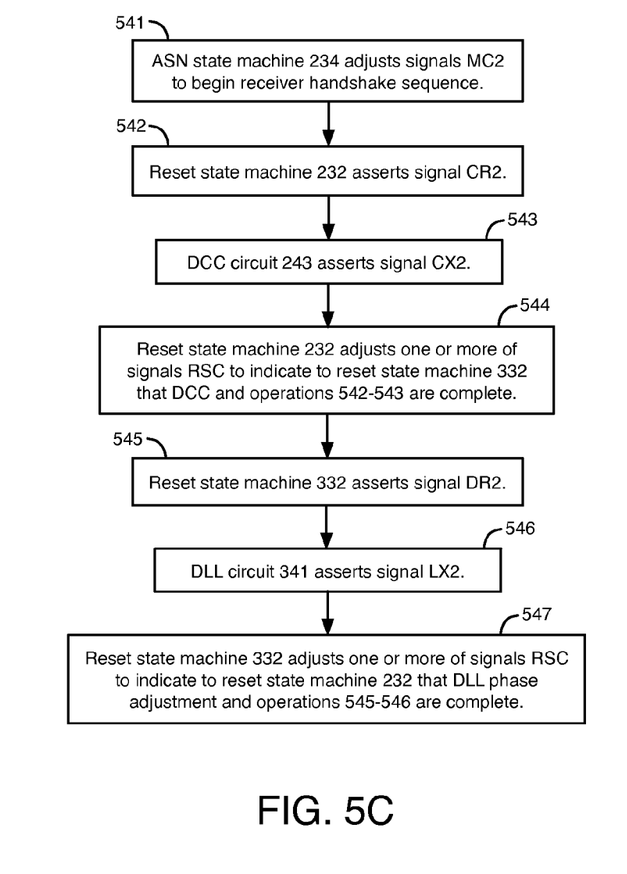

During operations 510, ASN state machine 234 initiates the duty cycle calibration and DLL phase adjustment processes within interface circuit 204 in response to signal PS1 being asserted. Also, during operations 510, ASN state machine 334 initiates the duty cycle calibration and DLL phase adjustment processes within interface circuit 303. FIGS. 5B-5C are flow charts that illustrate further details of operations 510. FIG. 5B illustrates operations 521-530 that are associated with a handshake sequence between transmitter circuits 211 and 311. FIG. 5C illustrates operations 541-547 that are associated with a handshake sequence between receiver circuits 212 and 312. Operations 521-530 in FIG. 5B and operations 541-547 in FIG. 5C are part of operations 510 in FIG. 5A. Adapter circuit 203 may begin the operations of FIG. 5C at the same time that adapter circuit 203 begins the operations of FIG. 5B.

The operations of FIG. 5B are now described. In operation 521, ASN state machine 234 adjusts one or more of signals MC1 to begin the transmitter handshake sequence between transmitter circuits 211 and 311. In operation 522, reset state machine 222 asserts the CR1 signal (e.g., drives signal CR1 high) in response to the adjustment to signals MC1 that occurs in operation 521. In response to signal CR1 being asserted, DCC circuit 242 adjusts the duty cycle of clock signal TCK2 relative to the duty cycle of clock signal TCK1 to reduce or eliminate duty cycle distortion (DCD) in clock signal TCK2. After the duty cycle calibration (DCC) process of DCC circuit 242 has completed, DCC circuit 242 asserts a signal CX1 in operation 523 to indicate that the DCC process of DCC circuit 242 has completed. Signal CX1 is provided through a conductor to reset state machine 222.

Reset state machine circuits 222 and 322 communicate with each other using asynchronous signals TSC. Signals TSC are transferred between dies 101-102 using shift register circuits and logic circuitry (not shown) that use time-division multiplexing (TDM) to transfer signals TSC. The shift register operates in response to a separate free running clock signal that is not impacted by the data rate change operations. In response to signal CX1 being asserted in operation 523, reset state machine 222 adjusts one or more of signals TSC in operation 524 to indicate to reset state machine 322 that operations 522-523 and the DCC process of DCC circuit 242 are complete.

In operation 525, reset state machine circuit 322 asserts signal CR3 (e.g., drives signal CR3 high) in response to the adjustment to signals TSC in operation 524. In response to signal CR3 being asserted, DCC circuit 342 adjusts the duty cycle of its output clock signal TCK4 relative to the duty cycle of clock signal TCK3 to reduce or eliminate duty cycle distortion in clock signal TCK4. After the duty cycle calibration (DCC) process of DCC circuit 342 has completed, DCC circuit 342 asserts a signal CX3 in operation 526 to indicate that the duty cycle calibration process of DCC circuit 342 has completed. Signal CX3 is provided to reset state machine 322 through a conductor. In response to signal CX3 being asserted in operation 526, reset state machine 322 adjusts one or more of signals TSC in operation 527 to indicate to reset state machine 222 that operations 525-526 and the DCC process of DCC circuit 342 are complete.

In operation 528, reset state machine circuit 222 asserts signal DR1 (e.g., drives signal DR1 high) in response to the adjustment to signals TSC in operation 527. In response to signal DR1 being asserted, DLL circuit 241 adjusts the phase of clock signal TCK5 based on the phase of clock signal TCK4. After the phase adjustment process in DLL circuit 241 has completed, DLL circuit 241 asserts a signal LX1 in operation 529 to indicate that the phase of clock signal TCK5 has been adjusted based on the phase of clock signal TCK4. For example, DLL circuit 241 may assert signal LX1 in operation 529 to indicate that the phase of clock signal TCK5 is aligned with (i.e., is locked to) the phase of clock signal TCK4.

In operation 530, reset state machine 222 adjusts one or more of signals TSC to indicate to reset state machine 322 that operations 528-529 and the DLL phase adjustment process of DLL circuit 241 are complete. Reset state machine 222 also adjusts one or more of signals MC1 in response to the assertion of signal LX1 to indicate to ASN state machine 234 that the phase adjustment process of DLL circuit 241 and the DCC processes of circuits 242 and 342 have completed.

The operations of FIG. 5C are now described. In operation 541, ASN state machine 234 adjusts one or more of signals MC2 to begin the receiver handshake sequence between receiver circuits 212 and 312. In operation 542, reset state machine circuit 232 asserts signal CR2 (e.g., drives signal CR2 high) in response to the adjustment to signals MC2 that occurs in operation 541. In response to signal CR2 being asserted, DCC circuit 243 adjusts the duty cycle of clock signal RCK2 relative to the duty cycle of clock signal RCK1 to reduce or eliminate duty cycle distortion in clock signal RCK2. After the duty cycle calibration (DCC) process of DCC circuit 243 has completed, DCC circuit 243 asserts a signal CX2 in operation 543 to indicate that the DCC process of DCC circuit 243 has completed. Signal CX2 is provided to reset state machine 232 through a conductor.

Reset state machine circuits 232 and 332 communicate with each other using asynchronous signals RSC. Signals RSC are transferred between IC dies 101-102 using shift register circuits and logic circuitry (not shown) that use time-division multiplexing (TDM) to transfer signals RSC. The shift register circuits operate in response to a separate free running clock signal that is not impacted by the data rate change operations. In response to signal CX2 being asserted in operation 543, reset state machine 232 adjusts one or more of signals RSC in operation 544 to indicate to reset state machine 332 that the DCC process of circuit 243 and operations 542-543 have completed.

In operation 545, reset state machine 332 asserts signal DR2 (e.g., drives signal DR2 high) in response to the adjustment to signals RSC in operation 544. In response to signal DR2 being asserted, DLL circuit 341 performs a phase adjustment process to adjust the phase of its output clock signal RCK3 based on the phase of clock signal RCK2. After the phase adjustment process in DLL circuit 341 has completed, DLL circuit 341 asserts a signal LX2 in operation 546 to indicate that the phase of clock signal RCK3 has been adjusted based on the phase of clock signal RCK2. As an example, DLL circuit 341 may assert signal LX2 to indicate that the phase of clock signal RCK3 is aligned with (i.e., is locked to) the phase of clock signal RCK2. Signal LX2 is provided through a conductor to reset state machine 332.

In response to signal LX2 being asserted, reset state machine 332 adjusts one or more of signals RSC in operation 547 to indicate to reset state machine 232 that the phase adjustment process in DLL circuit 341 and operations 545-546 have completed. After operation 547, reset state machine 232 adjusts one or more of signals MC2 in response to the adjustment to signals RSC in operation 547 to indicate to ASN state machine 234 that the phase adjustment process of DLL circuit 341 and the DCC process of circuit 243 have completed. During operations 510, ASN state machine 234 retains signal PS1 until signals MC1-MC2 indicate that the phase adjustment processes of DLL circuits 241 and 341 and the DCC processes of circuits 242-243 and 342 are complete.

In operation 511, reset state machine 222 enables the operation of FIFO circuit 223 by causing FIFO circuit 223 to exit the reset state in response to signal LX1 being asserted. In operation 511, reset state machine 222 de-asserts signal FR1 to cause FIFO circuit 223 to exit the reset state. Also, in operation 511, reset state machine 322 enables the operation of FIFO circuit 323 by causing FIFO circuit 323 to exit the reset state in response to the adjustment to signals TSC in operation 530. In operation 511, reset state machine 322 de-asserts signal FR3 to cause FIFO circuit 323 to exit the reset state.

Also, in operation 511, reset state machine 232 enables the operation of FIFO circuit 233 by causing FIFO circuit 233 to exit the reset state in response to the adjustment to signals RSC in operation 547. In operation 511, reset state machine 232 de-asserts signal FR2 to cause FIFO circuit 233 to exit the reset state. Also, in operation 511, reset state machine 332 enables the operation of FIFO circuit 333 by causing FIFO circuit 333 to exit the reset state in response to signal LX2 being asserted. Reset state machine circuit 332 de-asserts signal FR4 to cause FIFO circuit 333 to exit the reset state. After FIFO circuits 223, 233, 323, and 333 exit the reset states, FIFO circuits 223, 233, 323, and 333 can store new values of data and control signals again.

In operation 512, ASN state machine 234 asserts status signal PS2 in response to signals MC1 and MC2 indicating the completion of the DLL phase adjustment and duty cycle calibration processes described above with respect to operations 510. By operation 512, the interface circuits 204 and 303 are ready to resume data transfer based on the new frequencies (and/or phases) of clock signals RCK1 and TCK1.

Signal PS2 is provided to FIFO circuit 233 through a conductor and stored in FIFO circuit 233. The value of signal PS2 stored in FIFO circuit 233 is provided to sampler circuit 245 through a conductor as signal PS3. The value of signal PS3 is stored in sampler circuit 245 in response to clock signal RCK2. The value of signal PS3 stored in sampler circuit 245 is provided to sampler circuit 344 in IC die 102 through an external conductor as signal PS4. The value of signal PS4 is stored in sampler circuit 344 in response to clock signal RCK3. The value of signal PS4 stored in sampler circuit 344 is provided to FIFO circuit 333 through a conductor as signal PS5. The value of signal PS5 is stored in FIFO circuit 333. The value of signal PS5 stored in FIFO circuit 333 is provided to ASN state machine 334 through a conductor as signal PS6. The value of signal PS6 is stored in ASN state machine circuit 334.

When ASN state machine 234 asserts the status signal PS2 in operation 512, the signals PS3, PS4, PS5, and PS6 are subsequently asserted in response to the assertion of the previous status signal PS2, PS3, PS4, and PS5, respectively. Asserting each of the PS1-PS6 signals may, as an example, refer to generating a logic high pulse or a logic low pulse in the respective signal.

In operation 513, ASN state machine 334 asserts a status signal PS7 to indicate the completion of the data rate change process. ASN state machine 334 asserts signal PS7 in response to the assertion of signal PS6 after the completion of operations 511-512. Signal PS7 is provided to the MAC layer circuitry in core circuitry 301. When the MAC layer circuitry receives the assertion of signal PS7, the MAC layer circuitry determines that the data rate change process described above with respect to operations 501-513 has been completed. After the data rate change process described above with respect to operations 501-513 has completed, data is transmitted between circuit system 100 and external device 150 at the new data rate in operation 514. The transmit data and the received data are also provided through adapter circuits 203 and 302 and interface circuits 204 and 303 at the new data rate in operation 514.

Data received at the new data rate at circuit system 100 from external device 150 through link 160 is processed by PMA layer circuitry 201 and PCS circuitry 202, then stored in FIFO circuit 233, sampler circuits 245 and 344, and FIFO circuit 333 before being provided to the MAC layer circuitry in core circuitry 301, as described above. Data transmitted at the new data rate from circuit system 100 is provided from the MAC layer circuitry in core circuitry 301, then stored in FIFO circuit 323, sampler circuits 343 and 244, and FIFO circuit 223, and then processed by PCS circuitry 202 and PMA layer circuitry 201 before being transmitted to external device 150 through link 160 according to the data transmission protocol, as described above.

Figure 6:
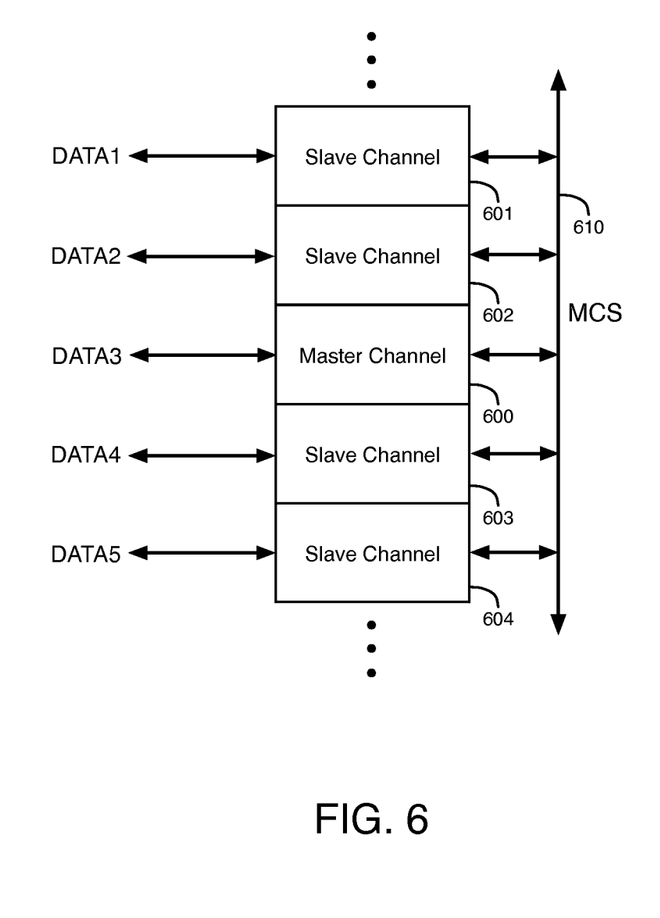
FIG. 6 illustrates an example of a circuit system having a master channel and multiple slave channels, according to an embodiment of the present invention.

FIG. 6 illustrates an example of circuit system 100 having a master channel and multiple slave channels, according to an embodiment of the present invention. One or both of the IC dies 101 and 102 may have a master channel and multiple slave channels in the same IC die, as shown in FIG. 6. FIG. 6 shows a master channel 600 and four slave channels 601-604. Although, it should be understood that each IC die 101 and 102 may have any number of slave channels.

The master channel 600 controls each of the slave channels 601-604, etc. that is in the same IC die 101 or 102 as the master channel and that communicates using the same communication link as the master channel. The master channel 600 and each of the slave channels 601-604, etc. may, for example, transmit and receive data through a different physical lane of a communication link according to a data transmission protocol, such as PCI Express. In FIG. 6, channels 601, 602, 600, 603, and 604 transmit and receive data signals DATA1, DATA2, DATA3, DATA4, and DATA5, respectively. Each of the 5 sets of data signals DATA1-DATA5 represents a set of transmit data and a set of received data in FIG. 6. The data indicated by data signals DATA1-DATA5 are transmitted across 5 different lanes of communication link 160 between channels 601, 602, 600, 603, and 604, respectively, and external device 150.

Master channel 600 generates a first subset of master control signals MCS that are provided through a first subset of conductors 610 within the IC die to each of the slave channels 601-604, etc. in the same IC die that communicate using the same communication link as channel 600. Master channel 600 receives a second subset of master control signals MCS that are provided through a second subset of conductors 610 from the slave channels 601-604, etc. to master channel 600. Master channel 600 uses control signals MCS to control the sequence of operations associated with a change in the data rate of the data that are shown in and described above with respect to FIGS. 5A-5C for channels 600-604, etc.

As an example, the first subset of control signals MCS may include a FIFO hold signal generated by an ASN state machine in master channel 600 that holds values stored in the FIFO circuits in each of the channels 600-604, such as signal FH1 in IC die 101 or signal FH2 in IC die 102, as shown in and described above with respect to FIGS. 2-3 and operation 502. The FIFO hold signal may be provided to each of the FIFO circuits in each transmitter and in each receiver in each channel 600-604.

Control signals MCS may also include, for example, control signals that control processes in the interface circuit in each channel 600-604. These control signals are transmitted between reset state machines in master channel 600 and the interface circuit in each channel 600-604. For example, signals MCS may include one or more of signals DR1, LX1, CR1, CX1, CR2, and CX2 in IC die 101 or signals CR3, CX3, DR2, and LX2 in IC die 102. Master channel 600 may use these control signals to control the resetting of the interface circuits, the phase adjustment process of one or more DLLs in the interface circuits, and the duty cycle calibration of clock signals in the interface circuits in channels 600-604, as described above with respect to FIGS. 2-5C.

In an embodiment, slave channels 601-604 do not have the ASN state machine and the reset state machines shown in each of FIGS. 2-3. Alternatively, the ASN state machine and the reset state machines in each of the slave channels 601-604 may be deactivated. In either of these two embodiments, the respective control signal CX1 and CX2 in IC die 101 or control signal CX3 in IC die 102 generated by each channel 600-604, etc. are consolidated (e.g., using an AND logic gate circuit) before being provided to the corresponding reset state machine in master channel 600. For example, the signals CX1 from all of the channels 600-604, etc. that share link 160 are provided to inputs of a first AND logic gate, and the output signal of the first AND logic gate is provided to the reset state machine 222 in master channel 600 to indicate when the duty cycle calibration processes have completed in all of the channels 600-604, etc. In this example, the signals CX2 from channels 600-604, etc. that share link 160 are provided to inputs of a second AND logic gate, and the output signal of the second AND logic gate is provided to reset state machine 232 in master channel 600 to indicate when the duty cycle calibration processes have completed in all of the channels 600-604, etc.

In an embodiment, the status signals PS1-PS7 from the master channel 600 in each IC die 101 and 102 are provided to the MAC layer circuitry in core circuitry 301. The MAC layer circuitry in core circuitry 301 is responsive only to the PS7 status signal from the master channel 600 to determine when the data rate change operations described with respect to FIGS. 5A-5C have been completed. The MAC layer circuitry in core circuitry 301 is not responsive to any status signal PS7 coming from any of the slave channels 601-604, etc.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. An integrated circuit die comprising:
an interface circuit to exchange data with an external device that is outside the integrated circuit die, wherein the interface circuit exchanges the data in response to a first clock signal, and wherein the interface circuit comprises a clock signal generation circuit to generate the first clock signal based on a second clock signal; and
an adapter circuit to exchange the data with the interface circuit using a first-in-first-out circuit that stores the data, wherein the first-in-first-out circuit stores a first data rate of the data as indicated by signals that are provided to the first-in-first-out circuit, wherein the signals are adjusted from the first data rate to a second data rate of the data to provide an indication of a change in a data rate of the data, wherein the first-in-first-out circuit stores the second date rate of the data indicated by the signals, wherein the adapter circuit causes the interface circuit to provide an adjustment to the first clock signal after a frequency of the second clock signal is changed in response to the indication of the change in the data rate of the data, and wherein the adapter circuit asserts a hold signal that places the first-in-first-out circuit into a hold state that preserves values of the data stored in the first-in-first-out circuit to prevent the exchange of data between the interface circuit and the external device until the adapter circuit receives an indication of completion of the adjustment to the first clock signal.

2. The integrated circuit die of claim 1, wherein the adapter circuit resets circuitry in the interface circuit in response to the indication of the change in the data rate before causing the interface circuit to provide the adjustment to the first clock signal.

3. The integrated circuit die of claim 1, wherein the adapter circuit comprises a master channel that generates the hold signal for controlling the hold state of the first-in-first-out circuit in the master channel and hold states of additional first-in-first-out circuits in slave channels in the integrated circuit die.

4. The integrated circuit die of claim 1, wherein the adapter circuit comprises a transmitter circuit and a receiver circuit, wherein the transmitter circuit comprises the first-in-first-out circuit to store transmit data, wherein the receiver circuit comprises an additional first-in-first-out circuit to store received data, and wherein the adapter circuit causes each of the first-in-first-out circuit and the additional first-in-first-out circuit to be in a reset state in response to the indication of the change in the data rate to prevent collision of a write pointer and a read pointer in each of the first-in-first-out circuit and the additional first-in-first-out circuit.

5. The integrated circuit die of claim 4, wherein the adapter circuit places the first-in-first-out circuit and the additional first-in-first-out circuit in hold states to maintain values stored in the first-in-first-out circuit and the additional first-in-first-out circuit in response to the indication of the change in the data rate before the adapter circuit causes each of the first-in-first-out circuit and the additional first-in-first-out circuit to be in the reset state.

6. The integrated circuit die of claim 4, wherein the adapter circuit enables the first-in-first-out circuit and the additional first-in-first-out circuit by causing each of the first-in-first-out circuit and the additional first-in-first-out circuit to exit the reset state in response to the indication of the completion of the adjustment to the first clock signal.

7. The integrated circuit die of claim 1, wherein the clock signal generation circuit comprises at least one of a delay-locked loop circuit or a duty cycle calibration circuit, and wherein the adapter circuit comprises at least one state machine circuit to control the interface circuit providing the adjustment to the first clock signal after the change in the frequency of the second clock signal.

8. The integrated circuit die of claim 1, wherein the adapter circuit causes the interface circuit to provide the adjustment to the first clock signal in response to the indication of the change in the data rate of the data.

9. The integrated circuit die of claim 1, wherein the adapter circuit comprises a transmitter circuit and a receiver circuit, wherein the transmitter circuit comprises the first-in-first-out circuit to store a first subset of the data, wherein the receiver circuit comprises an additional first-in-first-out circuit to store a second subset of the data, and wherein the interface circuit comprises a storage circuit to store the first subset of the data and the indication of the change in the data rate of the data in response to the first clock signal.

10. An integrated circuit die comprising:
an interface circuit; and
an adapter circuit comprising a transmitter circuit and a receiver circuit, wherein the transmitter circuit comprises a first first-in-first-out circuit to store first data received from a first external device through the interface circuit, wherein the receiver circuit comprises a second first-in-first-out circuit to store second data for transmission to the first external device through the interface circuit, wherein the interface circuit comprises a first storage circuit that stores at least one of the first data or the second data in response to a first clock signal, wherein the first first-in-first-out circuit stores a first data rate of the first data as indicated by signals, wherein the signals are adjusted from the first data rate to a second data rate of the first data to provide an indication of a change in a data rate of the first data, wherein the first first-in-first-out circuit stores the second date rate of the first data as indicated by the signals,
wherein the adapter circuit prevents the first and second first-in-first-out circuits from storing new values by placing the first and second first-in-first-out circuits into hold states that preserve values of the first and second data stored in the first and second first-in-first-out circuits in response to the indication of the change in the data rate of the first data until the adapter circuit receives an indication of a completion of an adjustment to the first clock signal.

11. The integrated circuit die of claim 10, wherein the adapter circuit permits the first and second first-in-first-out circuits to store new values in response to an indication of a phase of the first clock signal being locked to a reference phase, wherein the first storage circuit stores the first data in response to the first clock signal, and wherein the interface circuit further comprises a second storage circuit to store the second data in response to a second clock signal.

12. The integrated circuit die of claim 10, wherein the adapter circuit permits the first and second first-in-first-out circuits to store new values in response to an indication of calibration of a duty cycle of the first clock signal being completed, wherein the first storage circuit stores the first data in response to the first clock signal, and wherein the interface circuit further comprises a second storage circuit to store the second data in response to a second clock signal.

13. The integrated circuit die of claim 10, wherein the adapter circuit allows the first first-in-first-out circuit to store a value of a status signal that indicates completion of functions that are associated with the change in the data rate in response to the indication of the completion of the adjustment to the first clock signal.

14. The integrated circuit die of claim 10, wherein the first first-in-first-out circuit stores the signals that provide the indication of the change in the data rate of the first data before the adapter circuit prevents the first first-in-first-out circuit from storing new values in response to the indication of the change in the data rate, wherein the first data is transmitted to a second external device, and wherein the second data is received from the second external device.

15. A circuit system comprising:
a first integrated circuit die comprising a first interface circuit and a first adapter circuit; and
a second integrated circuit die comprising slave channels and a master channel, wherein the master channel comprises a second interface circuit and a second adapter circuit, wherein data is exchanged between the first and second adapter circuits through the first and second interface circuits, wherein the data is stored in the first interface circuit in response to a first clock signal, wherein the data is stored in the second interface circuit in response to a second clock signal that is derived from the first clock signal, and
wherein the second adapter circuit generates master control signals that control an adjustment to the second clock signal generated in the second interface circuit in the master channel and that control adjustments to third clock signals generated in third interface circuits in the slave channels in response to an indication of a change in a data rate of the data.

16. The circuit system of claim 15, wherein the second interface circuit adjusts a phase of the second clock signal based on the first clock signal in response to the master control signals, and wherein the third interface circuits in the slave channels adjust phases of the third clock signals in response to the master control signals.

17. The circuit system of claim 15, wherein the first adapter circuit causes the first interface circuit to provide an adjustment to the first clock signal in response to the indication of the change in the data rate of the data, and wherein the first adapter circuit prevents transmission of data from the first interface circuit to the second interface circuit until the first adapter circuit receives an indication of completion of the adjustment to the first clock signal.

18. The circuit system of claim 15, wherein additional data is stored in the second interface circuit in response to a fourth clock signal, wherein the second interface circuit adjusts a duty cycle of the fourth clock signal in response to an indication of a change in a data rate of the additional data, wherein the additional data is stored in the first interface circuit in response to a fifth clock signal derived from the fourth clock signal, and wherein the first interface circuit adjusts a phase of the fifth clock signal in response to the indication of the change in the data rate of the additional data.

19. A method comprising:
exchanging data through an interface circuit in an integrated circuit die in response to a first clock signal with an external device, wherein the exchange of the data with the external device is controlled by an adapter circuit in the integrated circuit die, wherein the integrated circuit die comprises a master channel and slave channels, and wherein the master channel comprises the adapter circuit and the interface circuit;
generating the first clock signal based on a second clock signal using a clock signal generation circuit in the interface circuit;
changing a frequency of the second clock signal in response to an indication of a change in a data rate of the data;
causing the interface circuit to provide an adjustment to the first clock signal using master control signals generated by the master channel in response to the indication of the change in the data rate of the data;
causing the slave channels to provide adjustments to third clock signals generated in the slave channels using the master control signals in response to the indication of the change in the data rate of the data; and
preventing exchange of data between the interface circuit and the external device using the adapter circuit until the adapter circuit receives an indication of completion of the adjustment to the first clock signal.

20. The method of claim 19, wherein preventing exchange of data between the interface circuit and the external device using the adapter circuit until the adapter circuit receives an indication of completion of the adjustment to the first clock signal further comprises resetting storage circuitry in the interface circuit that stores the data and storage circuitry in the adapter circuit that stores the data in response to the indication of the change in the data rate of the data before causing the interface circuit to provide the adjustment to the first clock signal.

* * * * *